(12) United States Patent
Zhang et al.

(10) Patent No.: US 12,736,346 B2
(45) Date of Patent: Sep. 15, 2026

(54) METHOD FOR RECORDING INSPECTION DATA

(71) Applicant: PROCEQ SA, Schwerzenbach (CH)

(72) Inventors: Shihua Zhang, Singapore (SG); Marcel Poser, Oberuzwil (CH); Antonio Caballero, Volketswil (CH)

(73) Assignee: PROCEQ SA, Schwerzenbach (CH)

( * ) Notice: Subject to any disclaimer, the term of this patent is extended or adjusted under 35 U.S.C. 154(b) by 111 days.

(21) Appl. No.: 18/563,961

(22) PCT Filed: Dec. 15, 2021

(86) PCT No.: PCT/EP2021/085822
§ 371 (c)(1),
(2) Date: Nov. 24, 2023

(87) PCT Pub. No.: WO2022/248076
PCT Pub. Date: Dec. 1, 2022

(65) Prior Publication Data
US 2024/0328789 A1 Oct. 3, 2024

(51) Int. Cl.
*G01C 21/16* (2006.01)
*G01C 21/20* (2006.01)

(52) U.S. Cl.
CPC ....... *G01C 21/1656* (2020.08); *G01C 21/206* (2013.01)

(58) Field of Classification Search
CPC ... G06T 2207/10016; G06T 7/70; G06T 7/73; G06T 7/0004; G06T 7/0002
See application file for complete search history.

(56) References Cited

U.S. PATENT DOCUMENTS 10,467,804 B2 11/2019 Fleischman et al.
10,762,698 B2 9/2020 Fleischman et al.
(Continued)

FOREIGN PATENT DOCUMENTS

CN 112 465 907 3/2021
EP 2 737 338 6/2014
(Continued)

OTHER PUBLICATIONS

CA-2695841-A1, Feb. 12, 2009, Bandyopadhyay Amrit, (Year: 2009).*
(Continued)

*Primary Examiner* — Mike Anderson
(74) *Attorney, Agent, or Firm* — GREENBLUM & BERNSTEIN, P.L.C.

(57) ABSTRACT

Method and system recording inspection data of an environment in scale drawing space. The method includes: receiving a sequence of images captured as a camera is moved along a camera path; generating an estimate of the camera path in sensor space based on the sequence of images; for a first image of the sequence, obtaining a first position in sensor space and receiving first input indicative of a first position of the camera in scale drawing space; for a second image of the sequence, obtaining a second position in sensor space and receiving second input indicative of a second position of the camera in scale drawing space; calculating transformation between sensor space and scale drawing space; receiving inspection data; and storing the inspection data with data of the inspection position in scale drawing space.

28 Claims, 4 Drawing Sheets

(56) References Cited

U.S. PATENT DOCUMENTS

| | | | |
|---|---|---|---|
| 10,944,959 B2 | 3/2021 | Fleischman et al. | |
| 2014/0129136 A1 | 5/2014 | Celia | |
| 2015/0350845 A1 | 12/2015 | Agarwal et al. | |
| 2020/0027267 A1* | 1/2020 | Fleischman | G06T 7/579 |
| 2020/0134866 A1 | 4/2020 | Kitaura et al. | |
| 2022/0281617 A1 | 9/2022 | Morita et al. | |
| 2023/0242279 A1* | 8/2023 | Jarecki | B64F 5/60<br>701/3 |

FOREIGN PATENT DOCUMENTS

| | | |
|---|---|---|
| JP | 2020-63979 | 4/2020 |
| JP | 2020-67439 | 4/2020 |
| JP | 2021-26274 | 2/2021 |
| WO | 2021/014514 | 1/2021 |

OTHER PUBLICATIONS

Birklbauer (Year: 2009).*

Int'l Search Report (Form PCT/ISA/210) conducted in Int'l Appln. No. PCT/EP2021/085822 (Mar. 9, 2022).

Int'l Written Opinion (Form PCT/ISA/237) conducted in Int'l Appln. No. PCT/EP2021/085822 (Mar. 9, 2022).

Japanese, Notice of Reasons For Rejection received in JP Application No. 2023-572830, dated Jul. 15, 2025, and English language translation thereof.

* cited by examiner

METHOD FOR RECORDING INSPECTION DATA

TECHNICAL FIELD

The invention concerns a method for recording inspection data of an environment in scale drawing space as well as an inspection system for carrying out the method.

BACKGROUND ART

Modern society relies on buildings, such as houses, office buildings, industrial buildings, bridges, streets, pipes and cables, which need to be maintained and kept in good condition in order be safe for the people in and around them. For an early detection of defects in the buildings, inspection is performed. Conventional inspection includes an inspector walking in or around the building and inspecting it. e.g. by eye and/or by non-destructive testing (NDT) method. Documentation of the inspection is usually done by acquiring inspection data, e.g. by taking photos and/or NDT data, and manually associating them with the inspection position, i.e. the location where the inspection data was acquired. Ideally, the documentation comprises the inspection data associated with their respective inspection positions in a scale drawing, whether it be in floor plan space, i.e. in the coordinate system of a floor plan of the building, in case of the scale drawing being a floor plan, or in map space, i.e. in the coordinate system of a map of an environment. Such conventional inspection is tedious and time-consuming since it requires a lot of manual interaction, in particular position logging, on the part of the inspector.

Recent improvements to inspection and in particular to the workflow of the inspector have been as follows: For outdoor inspection and where global navigation satellite system (GNSS) positioning, e.g. by GPS, is feasible, the inspection data may automatically be associated with the inspection position as measured by GNSS, i.e. without an extra interaction for positioning on the part of the inspector. However, simple GNSS positioning may not be precise enough for inspection purposes, where a precision in the order of meters or below may be required, e.g. for reasons of repeatability. Further, GNSS positioning may fail due to shadowing of a line-of-sight to GNSS satellites through buildings.

For indoor inspection where GNSS positioning usually is not feasible, the inspector still needs to provide data indicative of the inspection position manually. e.g. by tapping on a displayed floor plan of the inspected building at the inspection position. While this process is faster than conventional inspection, it still suffers from several disadvantages: Not only is it still tedious and time-consuming to manually provide the inspection location for each inspection datum, but it is also not very reliable since it is prone to errors on the part of the inspector.

DISCLOSURE OF THE INVENTION

The problem to be solved by the present invention is therefore to provide a method for recording inspection data of an environment, which is fast and at the same time associates reliable inspection positions to the respective inspection data, in particular in indoor use. Further, it may be an objective of the present invention to provide a method for recording inspection data of an environment, which works in the absence of an absolute positioning system, in particular in the absence of or with insufficient GNSS data.

This problem is solved by the following method for recording inspection data of an environment in scale drawing space. A scale drawing may e.g. be a floor plan. In this case, the environment typically is a building, such as a house, an office building, an industrial building or a bridge, and the scale drawing space may be termed floor plan space as throughout the following description.

In an alternative embodiment, the scale drawing may e.g. be a map, in particular a physical map. In this case, the environment typically is an outdoor environment or a mixed indoor-and-outdoor environment, e.g. with buildings, streets, paths, pipes and cables, and the scale drawing space may be termed map space. Such environment may e.g. comprise a construction site, in particular where an inspection is performed e.g. for non-destructive testing or for documentation reasons. In general, the following features disclosed in connection with a floor plan and floor plan space also apply to the alternative embodiment with the map and map space.

In particular, the floor plan comprises a two-dimensional, to-scale representation of the environment in floor plan space. The floor plan space is typically spanned by two, in particular horizontal, coordinate axes. Advantageously, the floor plan specifies positions and dimensions of physical features in the environment in floor plan space, in particular position and dimensions of at least one of walls, doors, windows, pillars and stairs. Positions and dimensions in floor plan space may e.g. be given in pixels or in meters. In the alternative embodiment of an outdoor or mixed indoor-and-outdoor environment, the positions and dimensions in map space may e.g. be given in meters or degrees (latitude, longitude), in particular the positions and dimensions of at least one of buildings, streets, paths and vegetation.

According to an aspect of the invention, the method comprises the following steps:

- receiving a sequence of images from a camera, the sequence of images captured by the camera as the camera is moved along a camera path through the environment: The camera may e.g. be carried along the camera path by a user, e.g. an inspector, or it may be part of a drone moving along the camera path, in particular autonomously or controlled from remote.
- generating an estimate of the camera path in sensor space based on the sequence of images: Techniques how this may be done are given below. The sensor space in particular is a representation of real space, which is three-dimensional, as sensed by the camera in two-advantageously horizontal-dimensions. Positions in sensor space may e.g. be expressed in meters.
- for a first image of the sequence of images, taken at a first position on the camera path, obtaining a first position in sensor space and receiving a first user input indicative of a first position of the camera in floor plan space: In other words, the first position represents a first calibration point for determining a transformation between sensor space and floor plan space.
- for a second image of the sequence of images, taken at a second position on the camera path, obtaining a second position in sensor space and receiving a second user input indicative of a second position of the camera in floor plan space: In other words, the second position represents a second calibration point for determining a transformation between sensor space and floor plan space.
- calculating a first transformation between sensor space and floor plan space based on the first position and second position in sensor space and the first position and second position in floor plan space: Typically, the first transformation may be represented by a first matrix. In particular, the transformation describes at least one of a translation, a rotation and a scaling.

at an inspection position on the camera path, receiving inspection data: As detailed later, an acquisition of inspection data may be triggered manually by the user or, in a different embodiment, automatically when certain conditions are fulfilled.

storing the inspection data together with data indicative of the inspection position in floor plan space: In other words, the inspection data are associated or tagged with their respective inspection positions. Data indicative of the inspection position in floor plan space are in particular data from which the inspection position in floor plan space is derivable.

Accordingly, the data indicative of the inspection position in floor plan space may e.g. comprise at least one of the following: the inspection position in floor plan space; the inspection position in sensor space together with the first (or other applicable) transformation between sensor space and floor plan space; a timestamp of the inspection data and a timestamped version of the first estimate of the camera path in floor plan space; a timestamp of the inspection data and a timestamped version of the first estimate of the camera path in sensor space together with the first (or other applicable) transformation between sensor space and floor plan space.

It is evident that such method for recording inspection data in floor plan space yields a fast, reliable and consistent positioning of the inspection data: At the start of an inspection, a calibration based on (at least) a first and a second position is necessary in order to establish the transformation between sensor space and floor plan space. With the transformation established, the camera only needs to be moved along the camera path, and the inspection data be acquired, but no further user interaction is required for recording the inspection position. Due to the lack of further user interactions, the method is less prone to positioning errors due to erroneous user inputs.

Such method is particularly advantageous when at least a part of the estimate of the camera path in sensor space is generated without taking into account GNSS position data. This is typically the case in indoor inspections, i.e. inside a building where no GNSS data is available due to GNSS signal attenuation by the building. Further, such situation typically occurs in outdoor inspections in built-up areas, where e.g. buildings hinder a sufficient GNSS data reception. Also, the described method provides a sufficient positioning precision, in particular in the order of meters or below, which may not be reached by standard GNSS positioning, e.g. without the use of a base station. In that respect, the method of the invention provides a precise, reliable and consistent positioning of the inspection data, indoors as well as outdoors.

Advantageous Embodiments

Advantageously, the estimate of the camera path in sensor space and the first transformation between sensor space and floor plan space are calculated in a device moved along the camera path together with the camera. The camera may be an integral part of the device. In particular, the device may be a tablet computer or a smartphone. Alternatively, the camera may be separate from the device, e.g. a camera worn on the chest or on the head of the user. In this case, the camera is connected to the device either wirelessly or through a cable.

In an advantageous embodiment, the device comprises a display configured to display a graphical representation of the floor plan and/or the inspection data.

The inspection data may be of different types: The inspection data may e.g. comprise an image received from the camera, i.e. the same camera that takes the sequence for images. Additionally, the inspection data may comprise an image from a 360-degree camera, e.g. mounted on a helmet of the user. Further, the inspection data may comprise non-destructive testing data, in particular at least one of a hardness value, ultrasonic data, ground-penetrating radar (GPR) data, eddy current data.

In a particularly advantageous embodiment, the estimate of the camera path, the first transformation and the data indicative of the inspection position in floor plan space are calculated in real time. "Real time" in this context means during the inspection, in particular in less than 1 s from acquiring the relevant data, which respectively are a most recent image of the sequence of images, the first and second user input and the inspection data.

Such real time positioning, in particular in connection with a display of the floor plan, allows the user to see and check his current position in floor plan space, e.g. by comparing his relative position regarding physical features of the building between reality and floor plan space. This may be of particular interest in case of drift in the positioning, i.e. when the first estimate of the camera path in sensor space—and hence also in floor plan space—deviates from the actual camera path in reality. In this case, the user may notice the drift in real time and correct it in real time. An example how this may be done is given below.

Further advantages of the real time positioning are that a previous camera path or the camera path followed up to now may be displayed to the user. Alternatively or additionally, the user may navigate to a predetermined inspection position, i.e. a position where inspection data shall be acquired, e.g. by looking at a display of his current position in floor plan space with regard to the predetermined inspection position.

Visual Odometry

In an embodiment, the first estimate of the camera path in sensor space is generated by performing visual odometry (VO), in particular feature-based VO, on the sequence of images. In this context, VO in particular means a process of determining the position and optionally also an orientation of the camera by analyzing images taken by the camera. In other words, VO is a process of incrementally estimating the position and orientation of the camera in motion by examining changes that the motion induces on the images taken by the camera.

Since VO facilitates to also determine the orientation of the camera, i.e. a camera viewing direction, when moved along the camera path, the method may advantageously be extended to comprise the following steps:

generating, in real time, an estimate of the camera viewing direction based on the sequence of images.

storing the inspection data together with data indicative of the camera viewing direction at the inspection position in floor plan space.

The estimate of the camera viewing direction may be displayed in real time in order to support his navigation through the environment. Further, the stored camera viewing direction at the inspection positions makes the evaluation of the inspection data as well as a repetition of the inspection at the same inspection positions easier.

While other positioning solutions based on a sequence of images, such as simultaneous localization and mapping (SLAM) aim at global consistency of the estimate of the camera path and in particular need closed loops in the camera path, VO only aims at local consistency in the estimate of the camera path. This releases the need to keep track of all of the sequence of images, as needed in SLAM, and makes VO less heavy in terms of computational power needed. VO, in particular with a two-point calibration as described above, may thus be performed in real time and on a mobile device such as a tablet computer or a smartphone.

In an advantageous embodiment, the first estimate of the camera path in sensor space is generated by performing feature-based VO. In such feature-based method, salient and repeatable features are extracted and tracked across subsequent images in the sequence of images. Alternatively, appearance-based VO, which uses the intensity information of all pixels in subsequent images, may be applied to generate the first estimate of the camera path. However, feature-based methods are generally more accurate and faster than appearance-based methods. For estimating the motion between subsequent images in the sequence, the well-known random sample consensus (RANSAC) algorithm is advantageously used due to its robustness in the presence of outliers.

In a general three-dimensional case, there are six degrees of freedom (DoF) to be estimated for the camera for each image in the sequence, namely e.g. three coordinates for the position and three angles for the orientation in sensor space. In this case, five corresponding positions in sensor space and in floor plan space would be needed for estimating the transformation between sensor space and floor plan space.

However, in the two-dimensional case of a floor plan, which by definition shows only one floor or level, planar motion may be assumed. Thus, in generating the estimate of the camera path in sensor space, a vertical component of the camera path is neglected. In this case, only three parameters need to be estimated, namely, e.g. an angle and a distance travelled by the camera between subsequent images and a viewing direction. Thus, only two points are needed, which again is computationally less expensive. This leads to the above-described two-point calibration with two user inputs required by the method. The same principle may be applied to the case of the scale drawing being a map, in particular of an outdoor environment: Even if minor changes in elevation, i.e. the vertical component, occur in an inspection area, e.g. less than 1 m elevation change over a horizontal distance of 10 m, a planar motion may be assumed and the vertical component of the camera path be neglected.

In an advantageous embodiment, the first position and the second position on the camera path are separated by at least a minimum distance, in particular by at least 1 m or at least 3 m. This ensures that the determined transformation between sensor space and floor plan space is reliable and accurate.

Multi-Point Calibration

A challenge in VO is that errors introduced by each image-to-image motion in the sequence accumulate over time. This generates the aforementioned drift of the first estimate of the camera path from the actual camera path. A solution to the problem of drift is to perform a re-calibration by establishing a third (or further) calibration point at a third position as follows.

Advantageously, the above method additionally comprises the steps of

- for a third image of the sequence of images, taken at a third position on the camera path, obtaining a third position in sensor space and receiving a third user input indicative of a third position of the camera in floor plan space,
- calculating a second transformation between sensor space and floor plan space based on the second position and third position in sensor space and the second position and third position in floor plan space,
- applying the second transformation for calculating data indicative of positions in floor plan space, which are located on the camera path after the third position.

In this way, a drift in the first estimate of the camera path is corrected, i.e. zeroed, at the third position. For the third position, the position of the camera in floor plan space (again) corresponds to its actual position in the environment. Evidently, such recalibration is advantageously repeated, e.g. in regular time or distance intervals. Since this extends the calibration from two points to many points, such method is called multi-point calibration.

Such method may further be extended to comprise the following steps:

- generating, in real time, an error measure for the estimate of the camera path.
- if the error measure exceeds a defined error threshold at a current position:
- outputting a warning or triggering the user to generate a further user input indicative of the current position of the camera in floor plan space,
- calculating a further transformation between sensor space and floor plan space based on the further position in sensor space and the further position in floor plan space.

Further, it is possible to apply the second or further transformation not only to positions on the camera path after the third or, respectively, further position, but also to a part of or all of the positions determined since the previous calculation of the transformation, i.e. the previous calibration. This is based on the assumption that already those positions are—to a certain degree—affected by the drift.

Accordingly, the above method may additionally comprise the steps of

- retrospectively applying the second transformation for calculating data indicative of positions in floor plan space, which are located on the camera path between the second position and the third position,
- in particular changing the stored data indicative of the inspection position in floor plan space for inspection data located on the camera path between the second position and the third position.

In this way, drift may also be corrected for inspection positions of inspection data that is already stored.

Visual Inertial Odometry

An accuracy of the first estimate of the camera path in sensor space may be improved by additionally including data of an inertial measurement unit (IMU), e.g. an accelerometer or a gyroscope, and/or of a magnetometer, e.g. a compass. In such embodiment, the method additionally comprises

- receiving acceleration data captured by an inertial measurement unit and/or orientation data captured by a magnetometer as they are moved along the camera path together with the camera,
- additionally using the acceleration data and/or orientation data for calculating the estimate of the camera path in sensor space.

In this case, the estimate of the camera path in sensor space may be generated by performing visual inertial odometry (VIO) on the sequence of images and at least one of the acceleration and orientation data. This improves the accuracy and makes the estimate of the camera path more robust, especially in situations with few overall features or few repeatable features in subsequent images of the sequence of images, as may be the case in long hallways or under poor light conditions.

Displaying Information

As mentioned before, the inspection may be facilitated by displaying various kinds of information to the user, i.e. the inspector.

In an embodiment, the method further comprises displaying, in real time, on a graphical representation of the floor plan, the inspection position and a current position of the camera in floor plan space. This supports the navigation of the user.

Further, the method may comprise displaying, in real time, on the graphical representation of the floor plan, the estimate of the camera path in floor plan space. It is understood that such estimate may be an aggregate estimate calculated by applying different transformations for the respective parts of the camera path. Such display of the camera path may again facilitate the navigation of the user. Moreover, it support the user in keeping track of the progress of inspection, i.e. which parts of the environment have already been inspected.

In case, the camera viewing direction is estimated, the method may further comprise displaying, in real time, on a graphical representation of the floor plan, the estimate of the camera viewing direction at the current position in floor plan space. This again facilitates navigation.

Also the two-point or multi-point calibration may be arranged in a simple and time-saving way by displaying the floor plan to the user. In such embodiment of the method, the step of receiving the first and/or second user input comprises the steps of displaying a graphical representation of the floor plan on a screen, and receiving an input event from the user indicative of a current position of the camera on the representation of the floor plan. The input event may e.g. be a tap or double tap on the screen. Alternatively, in particular in the case of an outdoor or mixed indoor-and-outdoor inspection, the input event may comprise an input of the current position in absolute coordinates of the map or floor plan, e.g. in degrees latitude and longitude in the case of GNSS coordinates. Such coordinates may be obtained from the map or floor plan, or they may be received from a GNSS receiver of the inspection system, which is essentially co-located with the camera.

Inspection Workflow

The method for recording inspection data, and thus the inspection workflow, may further be automated in the following ways:

In an embodiment, the method additionally comprises triggering to automatically acquire inspection data in defined time intervals and/or in defined intervals of space along the camera path. In this way, more inspection data, e.g. images taken by the camera, may be acquired, which leads to a better inspection coverage of the environment.

Alternatively or additionally, the method may comprise automatically triggering acquiring the inspection data upon reaching a predetermined inspection position, in particular when the distance between a current position of the camera and the predetermined inspection position falls below a defined threshold. e.g. 1 m. This is particularly useful when the user is guided through the environment, e.g. as follows.

In an embodiment, the method additionally comprises generating guiding information for guiding the user to a predetermined inspection position. This may e.g. be done by displaying the predetermined inspection position in floor plan space on a graphical representation of the floor plan. Another possibility displaying directions, e.g. in the form of arrows, to the predetermined inspection position. Such method makes it possible to guide the user along a predetermined, in particular optimized, route in order to cover all predetermined inspection positions and/or to save time.

Post-Processing and Reporting

The described method may be extended to allow for useful postprocessing and reporting options.

In an embodiment, the method further comprises storing raw data indicative of the estimate of the camera path in sensor space. In particular, the raw data may be given as three room coordinates of the camera path. Additionally, three rotation angles of the device may be comprised in the raw data. Alternatively, the orientation or rotation of the device may be expressed as a quaternion. Accordingly, the raw data may in particular comprise the quaternion, i.e. four numbers describing the orientation or rotation. Further a confidence measure for the accuracy of the estimated position on the camera path may be calculated and stored in the raw data.

Further, the method may comprise storing data indicative of the first, second and any further position in sensor space and of the first, second and any further position in floor plan space. This means that the calibration points are stored together with the raw data. Having the raw data as well as the calibration points available allows for various post-processing options, e.g. generating a replay of the camera path, determining an inspected area, which in particular may be the area imaged by the camera when being moved along the camera path, or correcting the estimate of the camera path or specific inspection positions during post-processing, i.e. after the inspection or the camera path is completed.

In a further embodiment, the method comprises automatically generating an inspection report. Since all relevant data, such as inspection data, inspection positions and the floor plan, are available, such inspection report may be output in a standardized form. This saves time on the part of the user. Also, it allows to perform a quick check for completeness of the inspection data, e.g. just after completing the inspection or, in other words, the camera path.

In particular, the inspection report may contain at least one of the following:

- a graphical representation of the floor plan with position marks of the inspection locations.
- a graphical representation of the floor plan with an indication of the camera path, e.g. as a line or a heat map, or an inspected area, e.g. as a shaded area or a heat map,
- the inspection data, e.g. the camera image or the acquired NDT data, together with a graphical representation of the respective inspection position on the floor plan.

Cold Start

A further embodiment of the method facilitates automatic relocalization subsequent to a cold start, i.e. after a device executing the method has been switched off and on again or after the estimate of the camera path has been lost or corrupted otherwise. Such method requires that a sequence of images has been taken in the same environment and that a two-point calibration as described above has been performed before cold start. In particular, a further sequence of images captured upon cold start needs to picture corresponding characteristic features of the environment as the sequence of images captured before cold start.

Such embodiment of the method further comprises generating and storing a representation of the environment in sensor space based on the sequence of images: In particular, the representation may contain characteristic features of the environment, such as changes in color or intensity.

upon cold start, receiving a further sequence of images from the camera located at a cold start position, generating an estimate of the cold start position in sensor space based on the further sequence of images and the representation of the environment: This may be done by correlating corresponding characteristic features in the sequence of images and the further sequence of images, i.e. feature-based. Further acceleration data and/or orientation data may be taken into account to generate the estimate of the cold start position in sensor space.

determining the cold start position in floor plan space based on the estimate of the cold start position in sensor space and on the transformation between sensor space and floor plan space calculated prior to cold start: In the case of multipoint calibration as described above, advantageously the transformation calculated last before cold start is applied.

Evidently, such method avoids the need for another two-point calibration after cold start, thereby saving time on the part of the user.

Computer Program Product

A second aspect of the invention relates to a computer program product comprising instructions which, when the program is executed by a computer, cause the computer to carry out any of the above methods.

In particular, the computer program product may be implemented in Apple's ARKit 4 or a comparable product, e.g. conveniently offering an algorithm for generating the estimate of the camera path in sensor space based on the sequence of images, e.g. by VO or VIO.

Inspection System

A further aspect of the invention relates to an inspection system comprising a camera configured to capture a sequence of images, e.g. a video camera, and a processor communicatively coupled with the camera and configured to carry out any of the above methods. The inspection system may e.g. be a tablet computer such as an iPad or a smartphone such as an iPhone. In such case, the camera may be used for both, capturing the sequence of images used for generating the estimate of the camera path and acquiring the inspection data in form of photos.

The inspection may be extended to further comprise a 360-degree camera configured to acquire inspection data. In particular, the 360-degree is connected to the processor via wireless or wired connection.

As discussed above, it is advantageous that the inspection system further comprises a display, in particular a touch screen, in communication with the processor. Such inspection system may comprise a tablet computer or a smartphone with their respective displays.

Further, the system may comprise at least one of an inertial measurement unit (IMU), in particular an accelerometer and/or a gyroscope, and/or a magnetometer. By taking into account the inertial data and/or orientation data acquired by the IMU and magnetometer, respectively, VIO is facilitated as a method of generating the estimate of the camera path as discussed above. In particular for outdoor inspection, the system may further comprise a GNSS receiver in communication with the processor. The GNSS receiver is advantageously configured to provide GNSS positioning data, e.g. in absolute coordinates such as degrees of latitude and longitude. Providing GNSS positioning data is particularly useful for the first and second positions of the calibration. Additionally, further GNSS positioning data may be taken into account, if available in sufficient quality and precision, at further positions along the camera path, by performing a multi-point calibration as described earlier.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

Figure 1:
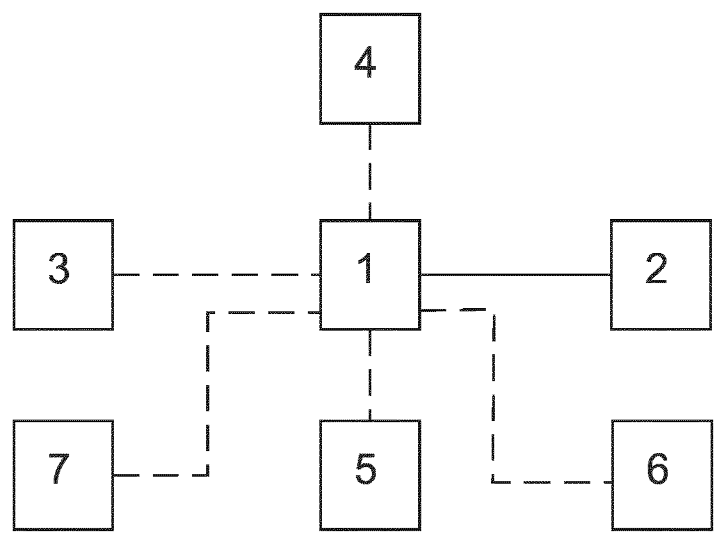
FIG. 1 shows a block diagram of an inspection system according to an embodiment of the invention.

The inspection system of FIG. 1 comprises a processor 1 and a camera 2 communicatively coupled to the processor 1. The camera 2 may be a video camera configured to record a plurality of images, i.e. frames, per second, e.g. 30 or 60 frames/s. The processor 1 and the camera 2 may be integral parts of the same device, e.g. a tablet computer or a smartphone. The processor is configured to perform a method as described above.

Optionally, the system of FIG. 1 may also comprise a display 3, e.g. a touch screen such as in the case of a tablet computer or smartphone. The display 3 is in connection with the processor 1, and configured to receive and display data from the processor 1, e.g. images captured by the camera 2, a floor plan, in particular with inspection positions, or inspection data.

The system may further comprise an IMU 4 configured to acquire acceleration and/or orientation data. The IMU may again be an integral part of the device, such as in the case of a tablet computer or a smartphone.

Further, the system may comprise a 360-degree camera 5 communicatively coupled to the processor 1, e.g. via a wireless connection, and carried by the user or a drone during inspection. The 360-degree camera 5 is configured to take 360-degree images of the environment. Such images facilitate a more detailed documentation of the inspection and a reconstruction of the environment in post-processing, e.g. in an augmented reality (AR) model. This allows a third party, e.g. a remote inspector, to retrace and evaluate the inspection later on and remotely.

Optionally, the system may also comprise an NDT sensor 6 communicatively coupled to the processor 1. The NDT sensor 6 may e.g. be a mechanical hardness sensor, an ultrasound transmitter, a GPR transmitter acquiring NDT data or a profometer acquiring eddy current data. The NDT data may be recorded during the inspection as inspection data and in particular displayed on the display 3 if needed.

Further, the system may comprise a GNSS receiver 7 communicatively coupled to the processor 1. The GNSS receiver 7 may comprise a GPS antenna and may be configured to provide GNSS position data, e.g. as coordinates in degrees of latitude and longitude. In such case, the calibration described above will in general include a coordinate transformation from coordinates provided by the GNSS receiver 20 in a global coordinate system, such as WGS84, to a local coordinate system of the inspection system, e.g. in sensor space, which gives positions typically in meters.

Figure 2:
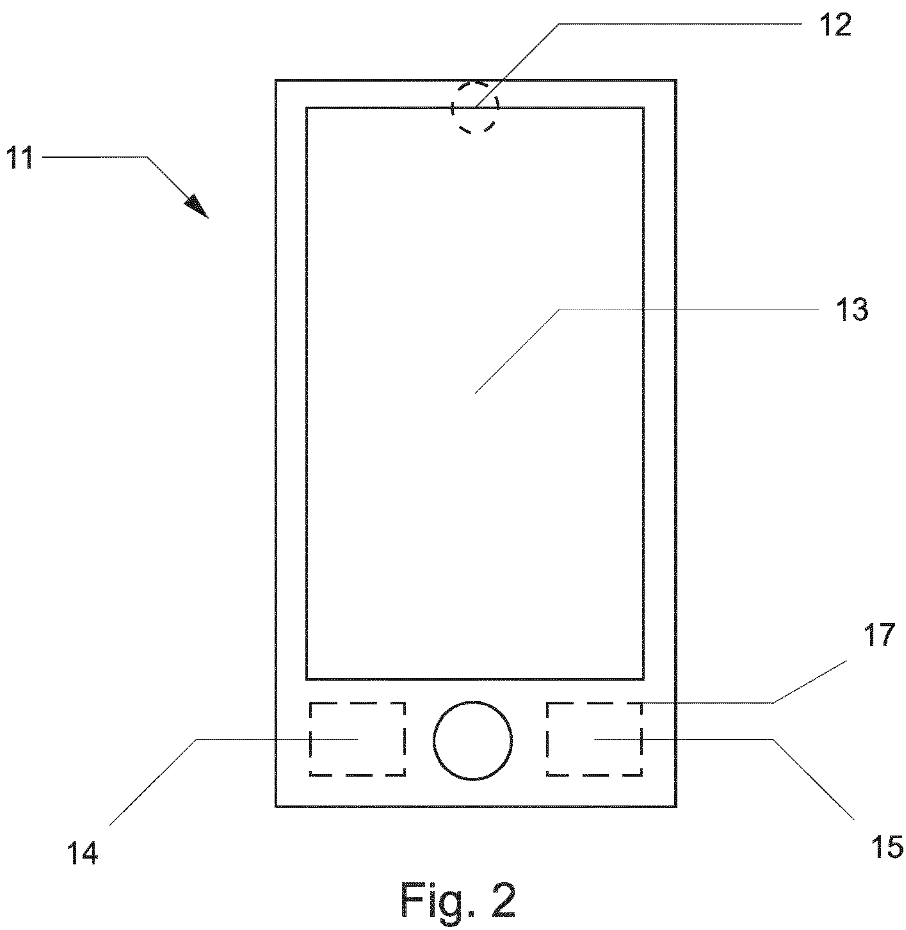
FIG. 2 shows a schematic view of a device for performing the method for recording inspection data according to an embodiment of the invention.

FIG. 2 shows a schematic view of an inspection device 11 which, in this case, is a conventional tablet computer or smartphone. The device 11 comprises a processor (not shown), a touch screen 13 on a front side, a camera 12, in particular mounted to a back side opposite to the front side, an IMU 14, a magnetometer or electronic compass 15 and a GNSS receiver 17 as integral parts. Such device 11 is suitable and may be configured for recording inspection data according to the above method. At least a part of the method may be implemented using readily available VO or VIO solutions, such as Apple's ARKit. In general, it is advantageous that the method is computer-implemented, e.g. as an app configured to display a user interface to the user. The app may guide the user through the inspection according to the method.

Figure 7A:
FIGS. 7*a* and 7*b* show a real-life example of a device performing a method for recording inspection data according to an embodiment of the invention.
Figure 7A:
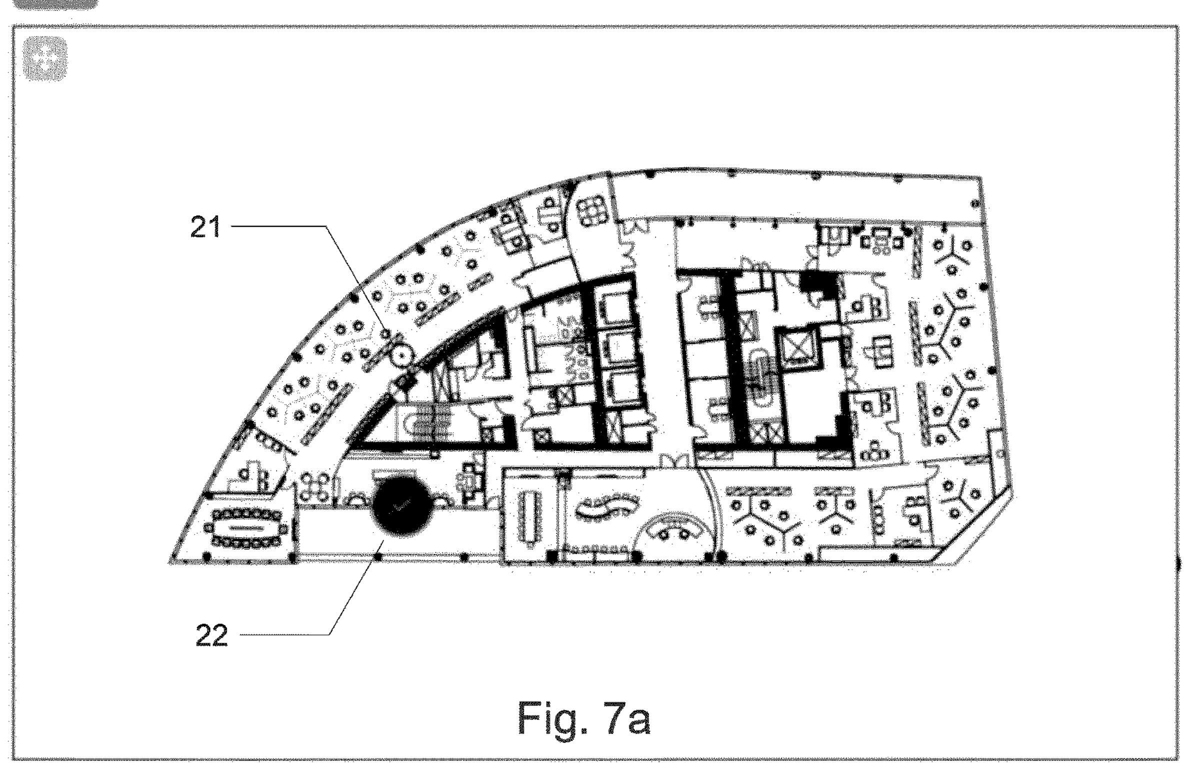
Figure 7B:
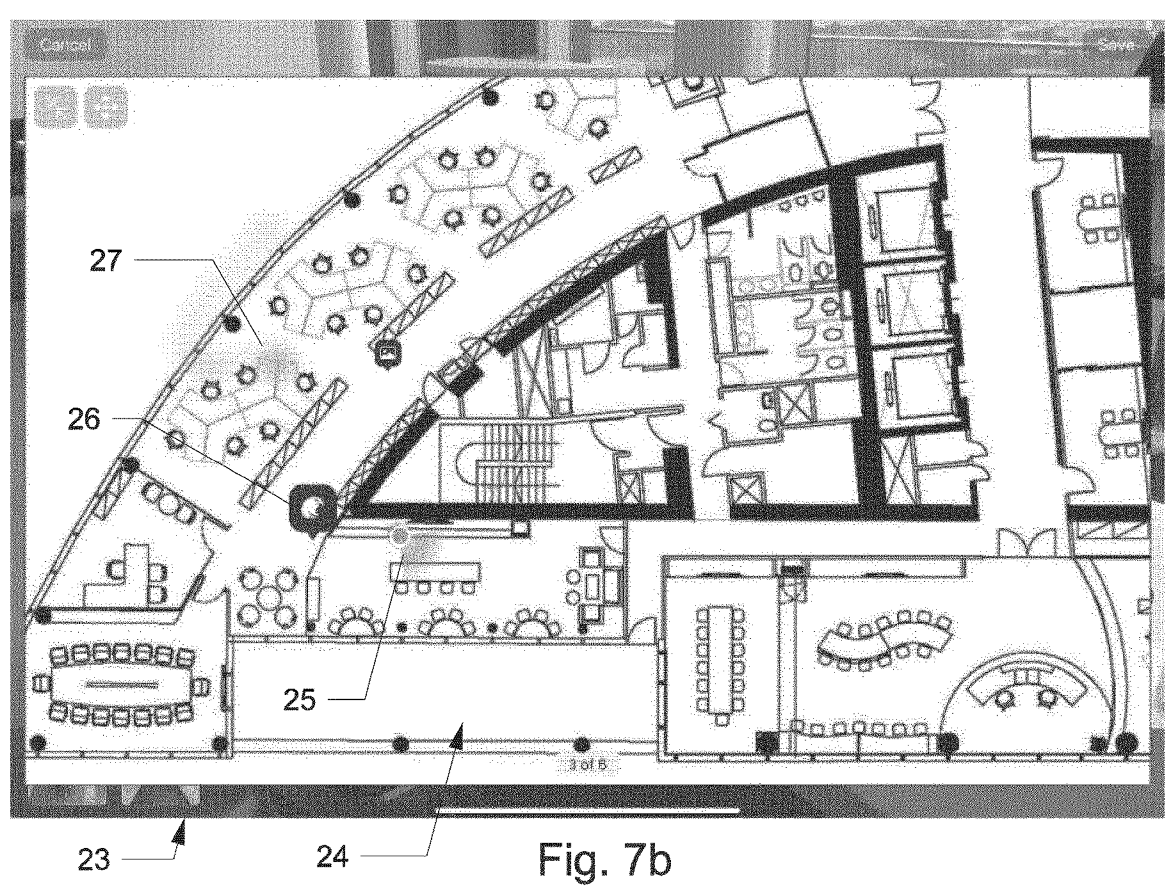

A real-life example of such device with an inspection app performing the above method is shown in FIGS. 7*a* and 7*b*. Both pictures represent screen shots from a tablet computer held by a user during inspection, while the tablet computer displays a floor plan of the building and floor where the user is situated. FIG. 7*a* shows the display of the app during calibration. While the camera of the device is acquiring a sequence of images in order to perform positioning in sensor space, the user needs to input the current (first) position in floor plan space. This can be done by moving cross-hairs icon 21 and checking the tick 22 when the cross-hairs icon 21 is at the current position. The procedure is repeated for a second position. With that, two-point calibration is performed, and the device is ready for the actual inspection.

FIG. 7*b* shows the display of the app after some inspection data has been acquired at respective inspection positions indicated, e.g. by balloon icons such as icon 26 displayed on the floor plan. In general, the app may allow the user to choose between a camera view 23, which in FIG. 7*b* is in the background, and a floor plan view 24, which in FIG. 7*b* is in the foreground. The camera view shows the section of the environment, which is currently in the camera's viewing angle. Typically, the user will acquire photos as inspection data in camera view. The floor plan view allows the user to see the determined current position on the floor plan, as indicated by dot symbol 25, together with the determined viewing direction of the camera, as indicated by the shaded segment adjacent to dot 25. Previous inspection positions, i.e. positions where inspection data have been taken, are shown as balloon icons 26. Moreover, the user may choose that the camera path up to the present position is displayed, e.g. as a line or, as indicated in FIG. 7*b* by shading 27, as a heat map depicting the inspected area.

Thus, the user can, in real time, monitor the camera's current position as well as the inspection data already acquired and the area already inspected. This enables the user to take control over the inspection, e.g. navigate to a predetermined inspection position, correct the estimate of the current position (see below) or even correct or repeat inspection data or positions already acquired.

Figure 3:
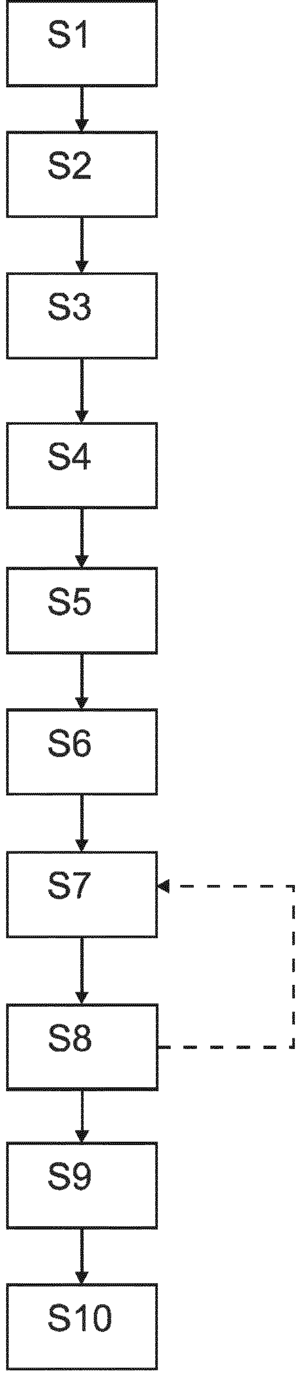
FIG. 3 shows a flow diagram of an inspection workflow according to an embodiment of the invention.

An inspection workflow according to an embodiment of the invention is shown in FIG. 3 in form of a flow diagram. In step S1, the user starts the inspection app on the inspection system or device, e.g. on a tablet computer or smartphone comprising a camera, an IMU and a touch screen. In step S2, the user selects a floor plan from a list of floor plans stored on the device or in a connected memory. In response, the app may display the selected floor plan to the user. In step S3, a positioning session is started within the app, either triggered manually by the user or automatically upon step S2 being completed. At the start of the positioning session, the user may be prompted to walk a few steps such that the camera and/or IMU acquires initial images and initial acceleration data, respectively, which are used in an initial calibration. In the initial calibration, an initial estimate of the orientation of the device may be generated.

In step S4, the two-point calibration described above begins. The user indicates the current position of the device on the floor plan displayed by the app, e.g. by a long-tap on the respective position on the touch screen. Optionally and as a user guidance, the user may be prompted by the app to do so. This position corresponds to the first position described before. Alternatively or additionally, the processor may receive GNSS positioning data from the GNSS receiver, if present, at the first position. Subsequently, the user walks a few meters away from the first position to a second position. Optionally and as a user guidance, the user may again be prompted to do so. In step S5, the user again indicates the current position of the device on the floor plan. e.g. as described above. Alternatively or additionally, the processor may, again, receive GNSS positioning data from the GNSS receiver for the second position. With the inputs relating to the first and second positions, the app performs the two-point calibration, i.e. it calculates the transform between sensor space and floor plan space. Then, the device is ready for the actual inspection.

In step S6, the user—while carrying the device—follows his intended inspection path, i.e. the camera path. In general, it is important that the environment along the camera path is sufficiently illuminated and in particular shows sufficient features such that VO may be reliably performed. This implies that subsequent images captured by the camera show corresponding features such that a motion tracking can be done. During the inspection, the app may continuously and in real time indicate the calculated current position of the device on the floor plan to the user. This facilitates navigation and enables the user to check whether the calibration, i.e. the transformation between sensor space and floor plan space, is still correct or whether the current position has drifted.

During the user following the inspection path, which in particular includes the user roaming freely without following a predetermined path, inspection data may be acquired manually, i.e. triggered by the user, or automatically, i.e. according to certain conditions such as in regular time or space intervals. This is done in step S7. Inspection data, e.g. an image by the camera, is acquired. In step S8, the inspection data is automatically tagged with the inspection position, i.e. the position of the device at the time when the inspection data is acquired. An advantage over conventional inspection methods is that no user interaction is required for the position tagging. This saves time and makes the inspection position more reliable.

Steps S7 and S8 are repeated as often as required, i.e. until the inspection path is completed. At the same time, the inspection positions where inspection data has been acquired may be shown on the floor plan in real time.

After completing the inspection path, the user terminates the positioning session and in particular exits the app in step S9. All inspection data with corresponding inspection positions are instantly available on the device, e.g. for checking a completeness of the coverage of the inspection or for post-processing.

Optionally, the inspection data and inspection positions may be transferred to a cloud memory in step S10. In the cloud memory, the inspection data can be accessed and evaluated by any authorized third party from remote. This facilitates simple post-processing and high-quality reporting.

Evidently, such inspection workflow is simple and may even be supported by guidance through the app. In comparison to conventional inspection routines, time is saved by automatic tagging of the inspection data with the corresponding inspection positions. Moreover, the inspection positions are acquired in a consistent and thus reliable manner. The whole inspection workflow is performed by the user with only one device, which make it simple and convenient.

Figure 4:
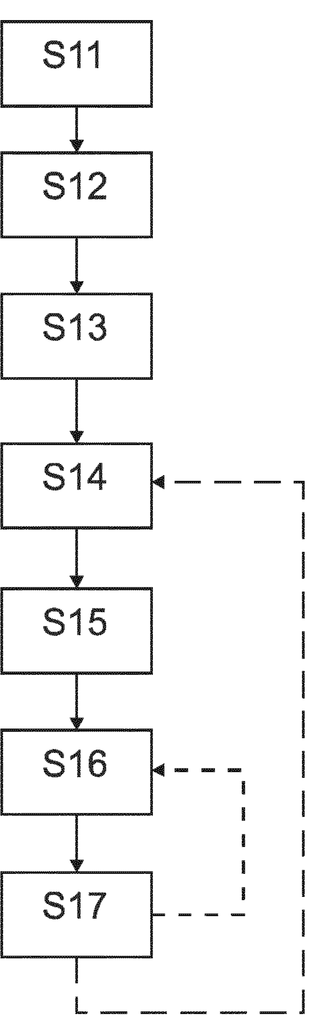
FIG. 4 shows a flow diagram of a method for recording inspection data according to an embodiment of the invention.

The flow chart of FIG. 4 shows the method for recording inspection data from the perspective of the app or, similarly, of the processor. The shown steps in particular start at step S3 of the above-described workflow, i.e. when the positioning session is started.

In step S11, a sequence of images, e.g. a real time video recording, is received from the camera of the device, while the device is moved through the building to-be-inspected or, in general, the environment to-be-inspected.

In step S12, a positioning algorithm, e.g. a VO algorithm, generates an estimate of the camera path in sensor space based on the sequence of images. This is usually done iteratively by extracting features from subsequent images, relating corresponding features in the subsequent images to each other and calculating the motion of the device in sensor space from the displacement of corresponding features between subsequent images.

Step S13 corresponds to step S4 in FIG. 3: At the first position, a first position is obtained in sensor space from the sequence of images. Also at the first position, a first user input indicative of the first position in floor plan space is received, e.g. via a tap of the user on the first position on the displayed floor plan. Alternatively, the first user input may trigger receiving the first position in floor plan space or map space from the GNSS receiver as described above.

Step S14 corresponds to step S5 in FIG. 3: At a second position, step S13 is repeated.

From the first and second position now being known in sensor space as well as in floor plan space, a transformation between sensor space and floor plan space is calculated in step S15. Since floor plan space typically is a 2D space but the real building is in 3D space, further constraints are necessary in order to be able to reconstruct the motion of the device in floor plan space from the sequence of images. A useful constraint for the inspection inside a building, but also in typical outdoor inspection environments such as a street, is the assumption of planar motion, i.e. the motion is purely horizontal with zero vertical component. In this case, a vertical component of positions in sensor space is neglected such that sensor space effectively becomes a 2D space. For two 2D spaces, the transformation between them is defined and may be determined from two points known in both spaces, such as the first and second position. The transformation is further illustrated in FIGS. 5 and 6.

In step S16, corresponding to step S7 of FIG. 3, the device has been moved to an inspection position, i.e. a position where inspection data are acquired. The inspection data. e.g. an image taken by the camera, are then received.

In step S17, corresponding to step S8 of FIG. 3, the inspection data are stored together with data indicative of the inspection position in floor plan space. The inspection position in floor plan space is typically derived by applying the determined transformation to the inspection data in sensor space that are calculated by the positioning algorithm on the basis of the sequence of images.

Steps S16 and S17 may be iterated for several inspection positions during an inspection. In the case of drift, i.e. an accumulation of positioning error, a re-calibration may be performed by iterating steps S14 to S17. This results in a further position—position n+1, being known in sensor space as well as in floor plan space. From the further position n+1 and the previous position n, an updated transformation between sensor space and floor plan space is calculated. The updated transformation is then used for determining subsequent positions in floor plan space from the sequence of images.

Figures 5A, 5B, 5C, 5D:
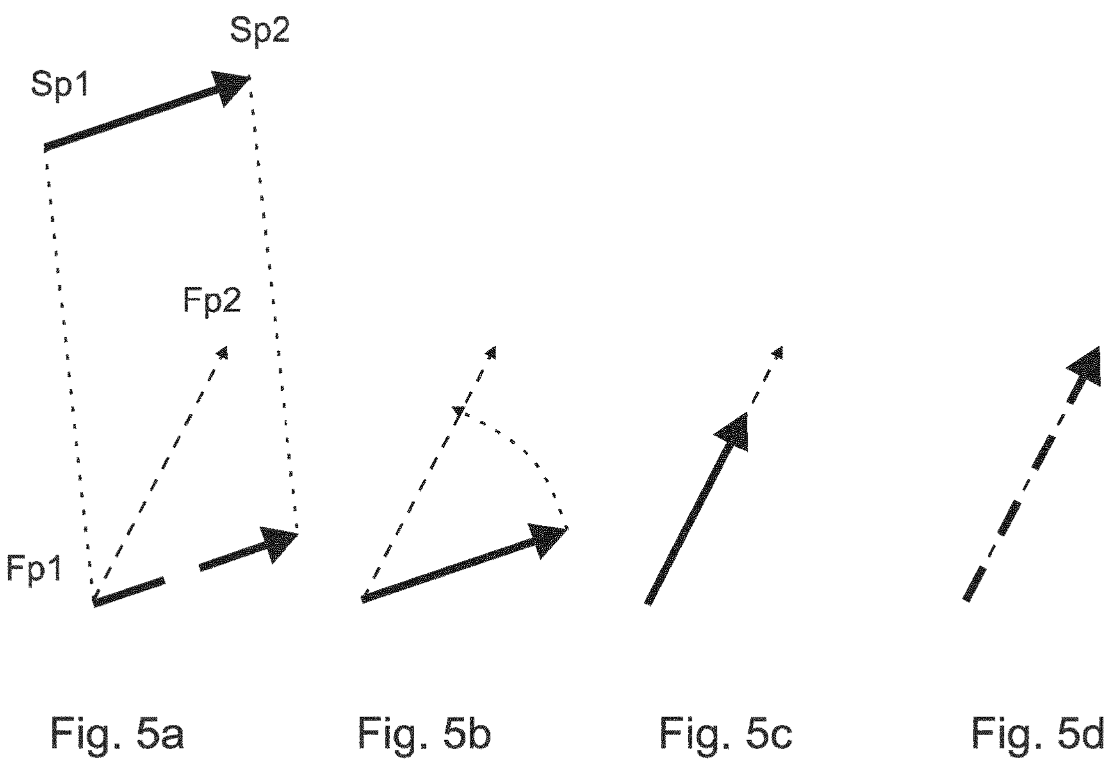
FIGS. 5*a* to 5*d* show a schematic illustration of a transformation between sensor space and floor plan space according to an embodiment of the invention.

FIGS. 5*a* to 5*d* schematically illustrates a transformation in 2D between sensor space and floor plan space. Such transformation in general comprises a translation, a rotation and a scaling. A motion, e.g. as estimated from subsequent images of the sequence of images taken by the camera, from point Sp1 to point Sp2 in sensor space is illustrated by the bold arrow in FIG. 5*a*. This motion corresponds to a motion from point Fp1 to point Fp2 in floor plan space as depicted by the thin dashed arrow. The desired transformation brings the two motions, and thus the arrows, in congruence, as shown in FIG. 5*d*. The transformation may be divided into intermediate steps: Between FIGS. 5*a* and 5*b*, the sensor space arrow Sp1-Sp2 is translated in order to originate from the same point as Fp1-Fp2. Between FIGS. 5*b* and 5*c*, the sensor space arrow is rotated in order to be oriented parallel to Fp1-Fp2. Between FIGS. 5*c* and 5*d*, the sensor space arrow is finally scaled in order to have the same length as Fp1-Fp2. Such transformation may be represented by a matrix. Thus, calculating the transformation between sensor space and floor plan space amounts to determining the matrix.

Figures 6A, 6B:
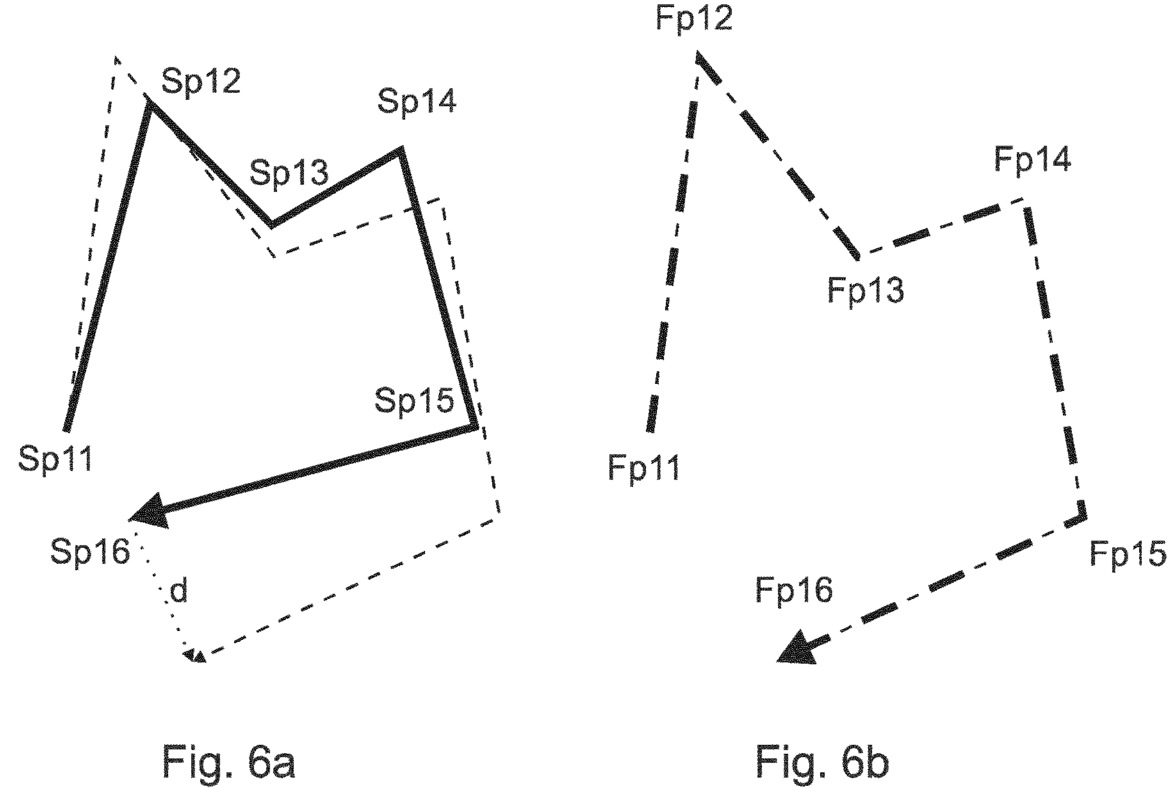
FIGS. 6*a* and 6*b* show a schematic illustration of multipoint calibration between sensor space and floor plan space according to an embodiment of the invention.

FIGS. 6*a* and 6*b* extend the two-point calibration of FIG. 5 to multiple two-point calibrations, in this case five calibrations, performed in sequence. The bold arrow Sp11-Sp12- . . . -Sp16 represents the camera path, which usually is equivalent to the inspection path or the user's path while carrying the inspection device, as estimated from the sequence of images taken by the camera and as transformed to floor plan space by an initial estimate of the transformation ("estimated camera path"). The thin dashed arrow Fp11-Fp12- . . . Fp16, on the other hand, represents the camera path in floor plan space, or, more precisely, the "true camera path" in floor plan space, which is the quantity that one wishes to retrieve. The estimated camera path deviates from the true camera path, e.g. because of drift. In this way, errors in positioning accumulate over the camera path, such that at the end point Sp16/Fp16, the estimated position is off by drift error d. This means that positions, e.g. inspection positions, determined during the inspection over time get more and more inaccurate.

In order to prevent this, multi-point calibration is performed. i.e. multiple two-point calibrations. At position Sp12/Fp12, a user input indicative of the current position in floor plan space is received. A first transformation is calculated from Sp11-Sp12 and Fp11-Fp12 and used in determining subsequent positions. Then again, at position Sp13/Fp13, a user input indicative of the current position in floor plan space is received. A second transformation is calculated from Sp12-Sp13 and Fp12-Fp13 and used in determining subsequent positions. And so forth. This is iterated as often as desired, either on the user's initiative, e.g. because the user notices a significant drift, or triggered by the device prompting the user to perform re-calibration, e.g. because a determined error measure exceeds a certain threshold. In case of GNSS positioning data being available with sufficient precision for the different positions Fp11-Fp12- . . . Fp16, the multi-point calibration may be performed based on these data.

In this way, the positioning error is kept in an acceptable range, e.g. below 1 m, and the inspection yields reliable inspection positions associated to the inspection data. At the same time, such method is robust due to its iterative nature and control by the user. Further, such method is computationally cheap such that it can be performed on a mobile device in real time.

The invention claimed is:

1. A method for generating an inspection report by recording inspection data of an environment in scale drawing space, comprising:

providing a camera capturing a sequence of images, moving the camera along a camera path through the environment, receiving the sequence of images from the camera, as the camera is moved along the camera path, generating an estimate of the camera path in sensor space based on the sequence of images wherein the estimate of the camera path in sensor space is generated by performing visual odometry on the sequence of images, and wherein at least a part of the estimate of the camera path in sensor space is generated without taking into account global navigation satellite system (GNSS) data, for a first image of the sequence of images, taken at a first position on the camera path, obtaining a first position in sensor space and receiving a first user input indicative of a first position of the camera in scale drawing space, the receiving of the first user input comprising displaying a graphical representation of a scale drawing on a screen, and receiving an input event from the user indicative of the first position of the camera on the graphical representation of the scale drawing, for a second image of the sequence of images, taken at a second position on the camera path, obtaining a second position in sensor space and receiving a second user input indicative of a second position of the camera in scale drawing space, the receiving of the second user input comprising displaying a graphical representation of the scale drawing on the screen, and receiving an input event from the user indicative of the second position of the camera on the graphical representation of the scale drawing, calculating a first transformation between sensor space and scale drawing space based on the first position and second position in sensor space and the first position and second position in scale drawing space, at an inspection position on the camera path, receiving inspection data, and storing the inspection data together with data indicative of the inspection position in scale drawing space, and automatically generating the inspection report, wherein the inspection data comprises non-destructive testing data including at least one of a hardness value, ultrasonic data, ground-penetrating radar (GPR) data, and eddy current data, wherein the inspection report contains at least one of:

a graphical representation of the scale drawing with position marks of the inspection positions, a graphical representation of the scale drawing with an indication of the camera path or an inspection area, and the inspection data together with a graphical representation of respective inspection positions on the scale drawing.

2. The method of claim 1, wherein the scale drawing is a floor plan, wherein the scale drawing comprises a two-dimensional, to-scale representation of the environment in scale drawing space, wherein the environment is a building.

3. The method of claim 1, wherein the scale drawing is a map, wherein the scale drawing comprises a two-dimensional, to-scale representation of the environment in scale drawing space, wherein the environment is an outdoor environment or a mixed indoor-and-outdoor environment.

4. The method of claim 1, wherein the scale drawing specifies positions and dimensions of physical features in the environment in scale drawing space including positions and dimensions of at least one of walls, doors, windows, pillars and stairs, and/or positions and dimensions of at least one of buildings, streets, paths, vegetation.

5. The method of claim 1, wherein the estimate of the camera path in sensor space and the first transformation between sensor space and scale drawing space are calculated in a device moved along the camera path together with the camera.

6. The method of claim 1, wherein the estimate of the camera path, the first transformation and the data indicative of the inspection position in scale drawing space are calculated in real time.

7. The method of claim 1, wherein the inspection data comprises an image received from the camera, wherein the inspection data additionally comprises an image from a 360-degree camera.

8. The method of claim 1, further comprising:

for a third image of the sequence of images, taken at a third position on the camera path, obtaining a third position in sensor space and receiving a third user input indicative of a third position of the camera in scale drawing space, calculating a second transformation between sensor space and scale drawing space based on the second position and third position in sensor space and the second position and third position in scale drawing space, applying the second transformation for calculating data indicative of positions in scale drawing space, which are located on the camera path after the third position.

9. The method of claim 8, additionally comprising:

retrospectively applying the second transformation for calculating data indicative of positions in scale drawing space, which are located on the camera path between the second position and the third position, and changing the stored data indicative of the inspection position in scale drawing space for inspection data located on the camera path between the second position and the third position.

10. The method of claim 1, wherein the data indicative of the inspection position in scale drawing space comprise at least one of the inspection position in scale drawing space, the inspection position in sensor space and the transformation between sensor space and scale drawing space, a timestamp of the inspection data and a timestamped version of the first estimate of the camera path in scale drawing space.

11. The method of claim 1, wherein in generating the estimate of the camera path in sensor space, a vertical component of the camera path is neglected.

12. The method of claim 1, further comprising:

receiving acceleration data captured by an inertial measurement unit and/or orientation data captured by a magnetometer as the inertial measurement unit and/or magnetometer is moved along the camera path together with the camera, additionally using the acceleration data and/or orientation data for calculating the estimate of the camera path in sensor space.

13. The method of claim 12, wherein the estimate of the camera path in sensor space is generated by performing visual inertial odometry on the sequence of images and at least one of the acceleration and orientation data.

14. The method of claim 1, further comprising:

displaying, in real time, on a graphical representation of the scale drawing, the inspection position and a current position of the camera in scale drawing space.

15. The method of claim 14, further comprising:

displaying, in real time, on the graphical representation of the scale drawing, the estimate of the camera path in scale drawing space.

16. The method of claim 1, further comprising:

generating, in real time, an estimate of a camera viewing direction based on the sequence of images and, if applicable, on the acceleration and/or orientation data, storing the inspection data together with data indicative of the camera viewing direction at the inspection position in scale drawing space.

17. The method of claim 16, further comprising:

displaying, in real time, on a graphical representation of the scale drawing, the estimate of the camera viewing direction at a current position in scale drawing space.

18. The method of claim 1, further comprising:

triggering to automatically acquire inspection data in defined time intervals and/or in defined intervals of space along the camera path.

19. The method of claim 1, further comprising:

automatically triggering acquiring the inspection data upon reaching a predetermined inspection position, when the distance between a current position of the camera and the predetermined inspection position falls below a defined threshold.

20. The method of claim 1, further comprising:

generating guiding information for guiding the user to a predetermined inspection position, by displaying the predetermined inspection position in scale drawing space on a graphical representation of the scale drawing, and/or by displaying directions to the predetermined inspection position.

21. The method of claim 1, further comprising:

generating, in real time, an error measure for the estimate of the camera path, if the error measure exceeds a defined error threshold at a current position:

outputting a warning or triggering the user to generate a further user input indicative of the current position of the camera in scale drawing space, calculating a further transformation between sensor space and scale drawing space based on the further position in sensor space and the further position in scale drawing space.

22. The method of claim 1, further comprising:

storing raw data indicative of the estimate of the camera path in sensor space, such as three room coordinates, three rotation angles and/or a confidence measure, storing data indicative of the first, second and any further position in sensor space and of the first, second and any further position in scale drawing space.

23. The method of claim 1, further comprising:

generating and storing a representation of the environment in sensor space based on the sequence of images, upon cold start, receiving a further sequence of images from the camera located at a cold start position, generating an estimate of the cold start position in sensor space based on the further sequence of images and the representation of the environment, determining the cold start position in scale drawing space based on the estimate of the cold start position in sensor space and on the transformation between sensor space and scale drawing space calculated prior to cold start.

24. A non-transitory computer-readable recording medium for use in a computer, the recording medium having executable instructions recorded thereon, wherein the executable instructions cause the camera to capture the sequence of images and cause generation of the inspection report to carry out the method of claim 1.

25. An inspection system, comprising:

the camera configured to capture the sequence of images and a processor in communication with the camera to carry out the method of claim 1.

26. The inspection system of claim 25, wherein the camera is a 360-degree camera in communication with the processor, configured to acquire inspection data.

27. The inspection system of claim 25, additionally comprising:

a display in communication the processor, wherein the inspection system comprises a tablet computer or a smartphone.

28. The inspection system of claim 25, additionally comprising at least one of:

an inertial measurement unit comprising an accelerometer and/or a gyroscope, a magnetometer, a GNSS receiver in communication with the processor.

* * * * *